United States Patent [19]

Nohira et al.

[11] Patent Number: 4,873,018

[45] Date of Patent: Oct. 10, 1989

[54] OPTICALLY ACTIVE COMPOUND, PROCESS FOR PRODUCING SAME AND LIQUID CRYSTAL COMPOSITION CONTAINING SAME

[75] Inventors: Hiroyuki Nohira; Masanao Kamei; Shinichi Nakamura, all of Urawa; Kazuo Yoshinaga, Machida; Mariko Kai, Sugitomachi; Kazuharu Katagiri, Tama, all of Japan

[73] Assignees: Canon Kabushiki Kaisha; Yamakawa Yakuhin Kogyo Kabushiki Kaisha, both of Tokyo, Japan

[21] Appl. No.: 112,936

[22] Filed: Oct. 27, 1987

Related U.S. Application Data

[62] Division of Ser. No. 919,376, Oct. 16, 1986, Pat. No. 4,798,680.

[30] Foreign Application Priority Data

Oct. 18, 1985 [JP] Japan ................... 60-232886
Feb. 26, 1986 [JP] Japan ................... 61-40793

[51] Int. Cl.$^4$ .............. G02F 1/13; C09K 19/52; C07C 69/76; C07C 69/00; C07G 41/00; C07G 43/02

[52] U.S. Cl. .............. 252/299.01; 252/299.6; 252/299.61; 252/299.63; 252/299.64; 252/299.65; 252/299.66; 252/299.67; 252/299.68; 350/350 R; 350/350 S; 558/56; 558/58; 560/11; 560/59; 560/60; 560/64; 560/66; 560/67; 560/102; 560/111; 560/130; 560/105; 560/141; 560/145; 560/55; 568/639; 568/630; 568/642; 568/655; 568/656

[58] Field of Search .......... 252/299.01, 299.5, 299.64, 252/299.66, 299.67, 299.68, 299.61, 299.6, 299.63, 299.65; 350/350 S, 350 R; 568/642, 655, 656, 639, 630; 560/11, 55, 59, 102, 105, 60, 64, 66, 67, 111, 141, 130, 145; 558/56, 58

[56] References Cited

U.S. PATENT DOCUMENTS

| | | | |
|---|---|---|---|
| 3,806,230 | 4/1974 | Haas | 252/299.68 |
| 4,576,732 | 3/1986 | Isogar et al. | 252/299.65 |
| 4,589,996 | 5/1986 | Inoue et al. | 252/259.65 |
| 4,592,858 | 6/1986 | Higuchi et al. | 252/299.66 |
| 4,613,209 | 9/1986 | Goodby et al. | 252/299.66 |
| 4,614,609 | 9/1986 | Inoue et al. | 252/299.66 |
| 4,615,586 | 10/1986 | Geary et al. | 252/299.01 |
| 4,622,165 | 11/1986 | Kano et al. | 252/299.65 |
| 4,638,073 | 1/1987 | Walba et al. | 252/299.67 |
| 4,695,650 | 9/1987 | Walba et al. | 252/299.67 |
| 4,695,651 | 9/1987 | Higuchi et al. | 252/299.66 |
| 4,723,005 | 2/1988 | Huynh-ba et al. | 252/299.65 |
| 4,725,688 | 2/1988 | Taguchi et al. | 252/299.61 |
| 4,728,458 | 3/1988 | Higuchi et al. | 252/299.65 |
| 4,732,699 | 3/1988 | Higuchi et al. | 252/299.66 |

FOREIGN PATENT DOCUMENTS

| | | | |
|---|---|---|---|
| 174816 | 3/1986 | European Pat. Off. | 252/299.66 |
| 3525015 | 1/1986 | Fed. Rep. of Germany | 252/299.66 |

OTHER PUBLICATIONS

Goodby, J. W. et al., J. Am. Chem. Soc., vol. 108, pp. 4729–4735 (Aug. 6, 1986).

*Primary Examiner*—Teddy S. Gron
*Attorney, Agent, or Firm*—Fitzpatrick, Cella, Harper & Scinto

[57] ABSTRACT

An optically active 2-fluoro-1-alkanol compound represented by the formula (Ia):

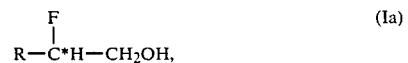

(Ia)

wherein R is an alkyl group having 1–16 carbon atoms, and C* is an asymmetric carbon atom; and an optically active compound derived from the fluoroalkanol and represented by the formula (Ib):

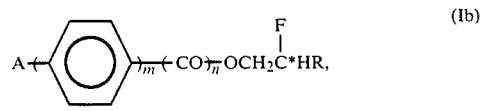

(Ib)

wherein R and C* are the same as above, m is 1 or 2, n is 0 or 1, and A is a releasable substitutent. Because of the fluorine atom directly attached to an asymmetric carbon atom, these compounds are particularly effective in increasing a spontaneous polarization, improving a electric field responsive characteristic of a liquid crystal composition, and controlling the liquid crystal state.

21 Claims, No Drawings

OPTICALLY ACTIVE COMPOUND, PROCESS FOR PRODUCING SAME AND LIQUID CRYSTAL COMPOSITION CONTAINING SAME

This is a division of application Ser. No. 919,376, filed Oct. 16, 1986, now U.S. Pat. No. 4,798,680.

FIELD OF THE INVENTION AND RELATED ART

The present invention relates to a novel optically active compound, a process for producing the same, and a liquid crystal composition containing the same.

There have been known various types optical devices characterized by having optical activities as will be exemplified as follows:

(1) Those utilizing a cholesteric-nematic phase transition in a liquid crystal state (J. J. Wysoki, A. Adams and W. Haas: Phys. Rev. Lett., 20, 10204 (1968);

(2) Those utilizing a guest-host effect of the White-Taylor type in a liquid crystal state (D. L. White and G. N. Taylor: J. Appl. Phys., 45, 4718 (1974)):

(3) Those utilizing a ferroelectric liquid crystal effect of a chiral smectic C phase, H phase, F phase, I phase or G phase (N. A. Clark and S. T. Lagerwall: Appl. Phys. Lett., 36 899 (1980));

(4) Others including notch filters or bond path filters utilizing selective scattering characteristics of a material having a cholesteric phase in the liquid crystal state when fixed in a matrix (F. J. Kahn: Appl. Phys. Lett., 18, 231 (1971)); and circular polarization beam splitters utilizing circular polarization characteristics (S. D. Jacobs, SPIE, 37, 98 (1981)).

These optical devices are important as display devices and modulation devices, while the explanation of the individual systems is left to the respective references and omitted.

Functional materials constituting these optical devices contain an optically active compound or substance as a major component thereof or as a component which is used in a relatively small proportion but constitutes a functionally important part. Many of such optically active functional compounds are synthesized through an intermediate which per se is optically active.

Heretofore, as optically active intermediates for synthesizing functional materials necessary for such optical devices characterized by optical activity, those compounds are known such as 2-methylbutanol, sec-octyl alcohol, sec-butyl alcohol, p-(2-methylbutyl)benzoic acid chloride, sec-phenethyl alcohol, amino acid derivatives, camphor derivatives and cholesterol derivatives.

However, these intermediates involve respective problems as follows. Thus, optically active chain hydrocarbon derivatives are difficult to modify their structures and very expensive except for a particular class thereof. Amino acid derivatives are relatively cheap and easy to modify their structures, whereas N-hydrogens therein are chemically active and liable to cause hydrogen bonding or other chemical reactions so that the performances of the resultant functional material can be restricted thereby. Camphor derivatives and cholesterol derivatives are difficult to modify the structures and the steric hindrance is liable to provide ill effects to the performances of the resultant functional materials.

Further, for a class of optical devices utilizing an electric field-responsive optical effect in a liquid crystal state, it has been practiced to introduce a polar group, whereas most of the above mentioned coventional optically active intermediates has a small polarity or have a structure where tha polar group cannot be effectively utilized.

It has been especially known for a ferroelectric liquid crystal that the response speed is proportional to its spontaneous polarization, so that it is desired to increase the spontaneous polarization for achieving a high speed driving. From such a viewpoint, P. Keller et al have shown that it is possible to realize a higher response speed through increase in spontaneous polarization by introducing a chlorine atom so as to be bonded to an asymmetric carbon atom (C.R. Acad. Sc. Paris, 282 C, 639 (1976)). However, the chlorine atom bonded to the asymmetric carbon atom is chemically unstable and has a large atomic radius so that the stability of the liquid crystal phase is lowered. Accordingly, an improvement is still desired.

The problems as described above have provided great difficulties in developing various functional materials.

SUMMARY OF THE INVENTION

A principal object of the present invention is, in view of the above problems, to provide a useful optically active which not only is useful as an appropriate optically active intermediate but also provides a high stability and a large spontaneous polarization when synthesized into a mesomorphic compound; a process for producing the same; and a liquid crystal composition containing the same.

a specific object of the present invention is to provide a mesomorphic compound capable of readily changing the length of the alkyl chain and therefore capable of controlling a kind of liquid crystal phase to be developed in the liquid crystal state and a temperature range therefor as shown by H. Arnold: Z. Phys. Chem., 226, 146 (1964), and a liquid crystal composition containing at least one of such mesomorphic compounds.

A further object of the present invention is to provide a compound capable of easily controlling the hydrophobic group and being stably formed into a film when applied to the LB (Langmuir-Blodget) film process for preparing an accumulation of single molecular films.

A more specific object of the present invention is to provide an optically active compound which is useful in controlling the liquid crystal state and has a group having a large dipole moment directly bonded to an asymmetric carbon atom, and a liquid crystal composition containing the same.

More specifically, the present invention aims at providing a compound showing a better electric field response by introducing a group having a large dipole moment to an asymmetric carbon atom.

First of all, the present invention provides an optically active 2-fluoro-1-alkanol represented by the formula (Ia):

wherein R is an alkyl group having 1–16 carbon atoms, and C* is an asymmetric carbon atom.

Further, the present invention provides an optically active compound represented by the formula (Ib):

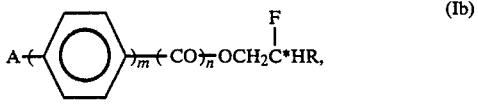

wherein R is an alkyl group having 1–6 carbon atoms; C* is an asymmetric carbon atom; m is 1 or 2, n is 0 or 1; and A is a releasable group such as OH, halogen, phenoxy, toluenesulfonyl, acetyloxy or trifluoroacetyloxy.

The optically active compound represented by the formula (Ia) is a compound which can be widely utilized, because it has an asymmetric carbon atom and a hydroxyl group connected through a methylene group so that it can be readily converted without losing its optical activity into various derivatives through an ester bond, an ether bond, an urethane bond, a carbonate bond, etc.

The compound represented by the formula (Ib) not only has functions of controlling a liquid crystal state and improving electric field responsive characteristics as described above, but also is expected to be used for synthesizing various derivatives without losing its optical activity by combining it with other functional intermediates, because it has an asymmetric carbon atom and a reactive substituent group represented by A.

These optically active compounds represented by the formulas (Ia) and (Ib), however, have not been known heretofore. As a result of our intensive study, we have succeeded in synthesis of these compounds and arrived at the present invention.

The optically active 2-fluoroalkanol represented by the formula (Ia) may be synthesized by addition of hydrogen fluoride to an optically active 1,2-epoxy alkane represented by the formula (II):

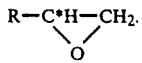

The compound represented by the formula (Ib) may be prepared by reacting the above mentioned optically active 2-fluoro-1-alkanol with a p-substituted benzoic acid or a p-substituted biphenylcarboxylic acid to cause an esterification; or by tosylating or halogenating the 2-fluoro-1-alkanol followed by reaction with hydroquinone or 4,4'-dihydroxybiphenyl.

The optically active compound represented by the formula (Ia) not only is a useful optically active intermediate but also is a useful liquid crystal component by itself. For example, when it is added in a very small amount in a nematic liquid crystal composition for a TN (twisted nematic)-type display device, it may effectively prevent the occurrence of a fringe pattern (reverse domain) to uniformize the display. This also holds true with the optically active compound represented by the formula (Ib).

Thus, the present invention also provides a liquid crystal composition containing an optically active compound represented by the formula (Ia) or (Ib).

The above mentioned and other objects and features of the invention will be better understood upon consideration of the following detailed description concluding with specific examples of production.

DETAILED DESCRIPTION OF THE INVENTION

In order to produce an optically active 2-fluoro-1-alkanol represented by the formula (Ia) according to the present invention, an optically active 1,2-epoxy-alkane may be used as a starting material. Such an optically active 1,2-epoxy-alkane may be readily obtained through an asymmetric epoxidization of an olefin by using a micro-organism (e.g., H. Ohta, H. Tetsukawa, Agric. Boil. Chem., 43, 1979, 2099).

Then, the optically active 1,2-epoxyalkane is subjected to addition of hydrogen fluoride to obtain an optically active 2-fluoro-1-alkanol.

An example of the synthesis process is shown by the following scheme:

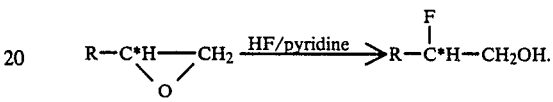

The following Table 1 shows some examples of the 2-fluoro-1-alkanol according to the present invention (Details of the synthesis processes will be described in the Examples appearing hereinafter).

TABLE 1

| Example | R | Yield (%) | $[\ ]_D$ (C = 2 Et$_2$O) | b.p. (°C./mmHg) |
|---|---|---|---|---|
| 1 | n-C$_5$H$_{11}$— | 37 | −11.5 (C = 1) | 126–129/104 |
| 2 | n-C$_6$H$_{13}$— | 43 | −10.4 | 122–124/85 |
| 3 | n-C$_4$H$_9$— | 35 | −9.9 | 118–121/140 |
| 4 | n-C$_7$H$_{15}$— | 42 | −10.3 (C = 1) | 135–136/45 (m.p. 31–32° C.) |
| 5 | n-C$_8$H$_{17}$— | 50 | −8.6 | 135–138/28 (m.p. 36–40° C.) |
| 6 | n-C$_{10}$H$_{21}$— | 55 | −7.2 | (m.p. 51–53° C.) |

The 2-fluoro-1-alkanol according to the present invention can have a wide variety of R by changing the number of carbon atoms in the alkane moiety in the starting 1,2-epoxyalkane but may preferably have an alkyl R of 6–16 carbon atoms.

The optically active compound represented by the formula (Ib) according to the present invention, may be prepared from an optically active 2-fluoro-1-alkanol of the above mentioned formula (Ia).

The optically active 2-fluoro-1-alkanol may be esterified with a p-substituted benzoic acid or a p-substituted biphenylcarboxylic acid to form an optically active compound of the formula (Ib) wherein n is 1. A compound wherein A is acetyloxy may be readily converted into one having a hydroxyl group by further reacting it with benzylamine.

In the esterification, an equi-molar or less amount of an acid chloride may be reacted with the 2-fluoroalkanol in the presence of pyridine or triethyleneamine. The reaction may be effected at a temperature of 30°–80° C., preferably 40°–60° C. The reaction period may preferably be 3 hours or more.

Further, an optically active compound of n=0 in the above formula (Ib) may be prepared by reacting a p-toluenesulfonic acid ester of the above optically active 2-fluoro-1-alkanol or an optically active 2-fluoro-1-bromoalkane derived from the optically active 2-fluoro-1-alkanol with hydroquinone or 4,4'-dihydroxybiphenyl to cause mono-esterification in an ordinary manner.

Examples of the above mentioned series of reactions may be represented by the following reaction scheme:
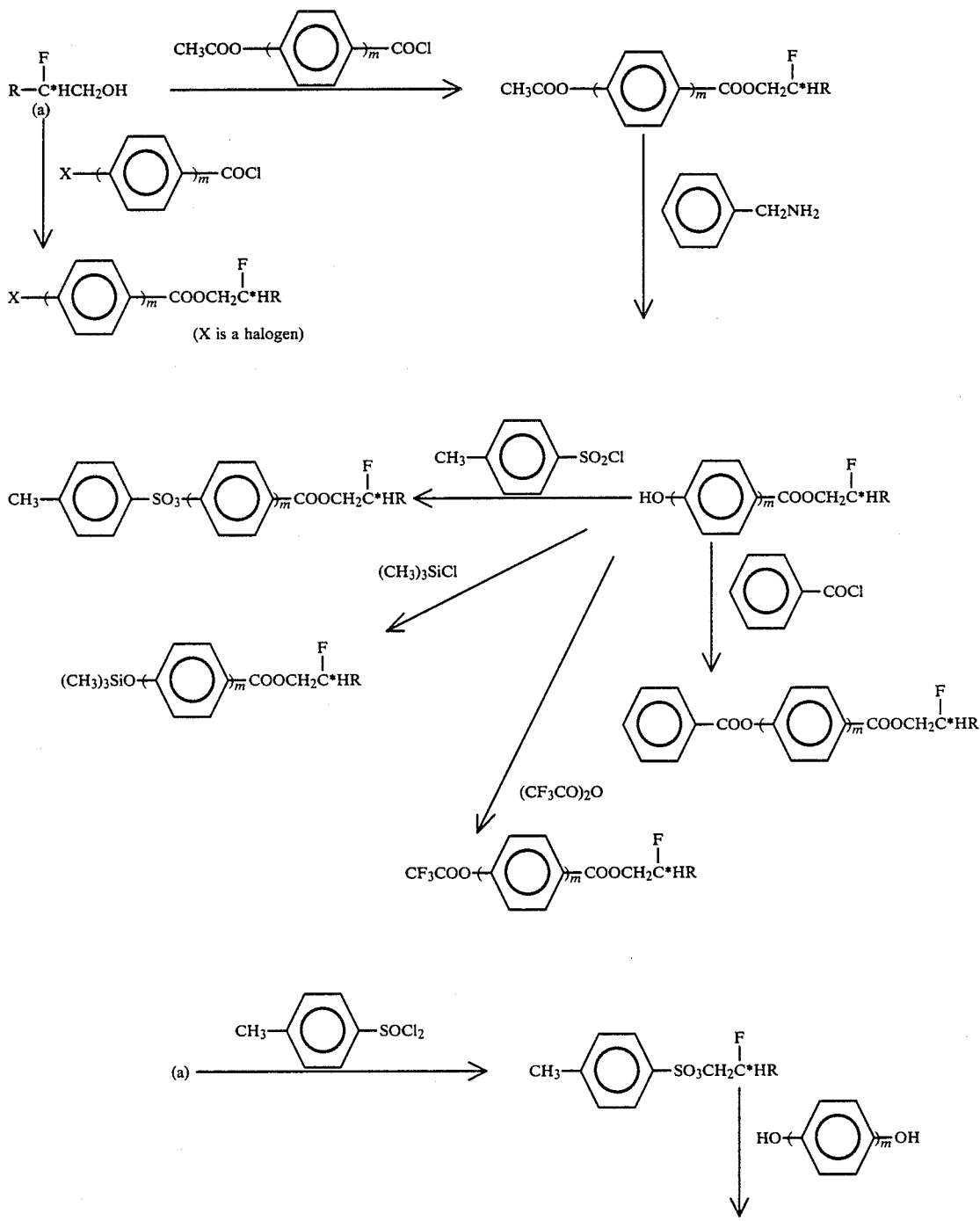

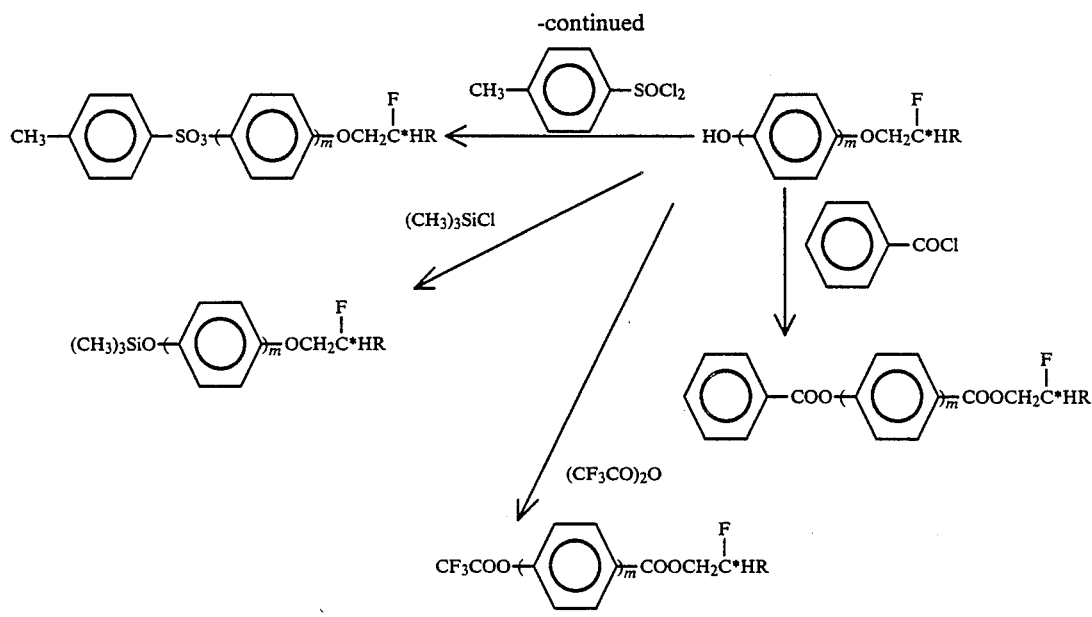

The optically active compound according to the present invention represented by the formula (Ib) can have a wide variety of R by changing the number of carbon atoms in the alkanol moiety in the starting 2-fluoro-1-alkanol but those having an alkyl R of 1–16 carbon atoms are provided by the present invention.

As has been briefly mentioned hereinbefore, the optically acitve compound represented by the formula (Ia) or (Ib) may be used instead of a conventionally used optically active compound such as a hydrocarbon chain derivative, an amino acid derivative, a camphor derivative, or a cholesterol derivative, and may be connected with another intermediate through ester bond, ether bond, urethane bond, carbonate, etc., by using a releasable reactive group such as hydroxyl group. For this reason, the optically active compound is not only useful as an intermediate for producing functional materials constituting optical devices, but also useful as an intermediate for synthesizing various natural optically active compounds.

Further, the optically active compound represented by the formula (Ia) or (Ib) is effectively used for preventing generation of reverse domain in a TN-type cell by adding it into a nematic liquid crystal. In this case, the optically active compound of the formula (Ia) or (Ib) may preferably be used in a proportion of 0.01–50 wt.% of the resultant liquid crystal composition.

Further, the optically active compound may be used to form a chiral nematic liquid crystal composition for use in a phase-transition type liquid crystal device or guest-host type liquid crystal device of the White-Taylor type by adding it into a nematic or chiral nematic liquid crystal. In this case, the optically active compound of the formula (Ia) or (Ib) may preferably be used in a proportion of 0.01–80 wt.% of the resultant liquid crystal composition.

Further, the optically active compound of the formula (Ia) or (Ib) may be added to a liquid crystal material showing a ferroelectric chiral smectic liquid crystal state by itself in a proportion of 0.01–80 wt.% of the liquid crystal composition to form a liquid crystal composition with improved characteristics.

Furthermore, the optically active compound of the formula (Ia) or (Ib) may be added to a smectic liquid crystal with a structural unit such as biphenyl-4-carboxylate, azoxybenzene, 2-phenyl-pyridine, phenyl benzoate, etc., including those shown below at (1)–(5) with structural formulas and phase transition temperatures (°C.), to provide a liquid crystal composition showing a ferroelectric chiral smectic phase. In this case, the optically active compound of the formula (Ia) or (Ib) may be used in a proportion of 0.01–80 wt.% of the resutlant liquid crystal composition. When the optically active compound of the formula (Ia) or (Ib) is added to provide a chiral smectic liquid crystal composition in the manner as described above, the liquid crystal composition can have a large spontaneous polarization, a shorter response time, and a lower threshold voltage.

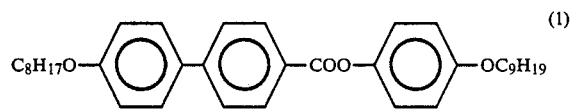

(4-nonyloxyphenyl)-4'-octyloxybiphenyl-4-carboxylate

Cryst. $\underset{74}{\overset{107}{\rightleftarrows}}$ SmB $\overset{117}{\rightleftarrows}$ SmC $\overset{160}{\rightleftarrows}$ SmA $\overset{195}{\rightleftarrows}$ Iso.

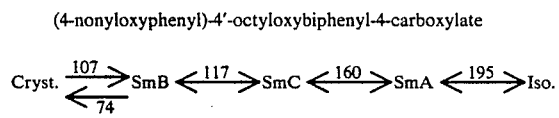

4,4'-decyloxyazoxybenzene

Cryst. $\overset{77}{\rightleftarrows}$ SmC $\overset{120}{\rightleftarrows}$ N $\overset{123}{\rightleftarrows}$ Iso.

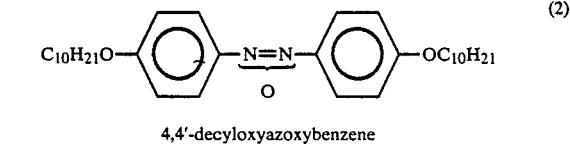

2-(4'-hexyloxyphenyl)-5-(4-hexyloxyphenyl)-pyrimidine

Cryst. $\overset{120}{\rightleftarrows}$ SmC $\overset{189}{\rightleftarrows}$ SmA $\overset{216}{\rightleftarrows}$ Iso.

-continued

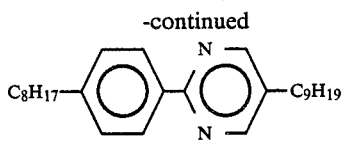

2-(4'-octyloxyphenyl)-5-nonylpyrimidine

Cryst. $\xrightarrow{33}$ SmC $\xleftarrow{60}$ SmA $\xleftarrow{75}$ Iso.   (4)

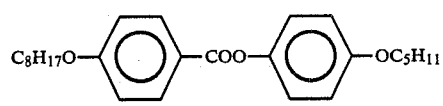

4'-pentyloxyphenyl-4-octylazoxybenzoate

Cryst. $\xrightarrow{58}$ SmC $\xrightarrow{64}$ SmA $\xrightarrow{66}$ N $\xrightarrow{85}$ Iso.   (5)

Herein, the symbols respectively denote the following phases:
Cryst.: crystal phase
SmA: smectic A phase
SmB: smectic B phase
SmC: smectic C phase
N: nematic phase
Iso.: isotropic phase As described above, according to the present invention, there are provided an optically active compound represented by the formula (Ia) which is useful as an optically active intermediate for synthesizing a functional material required for optical devices characterized by having an optical activity, and an optically active compound represented by the formula (Ib) which has a fluorine atom providng a large dipole moment directly attached to an asymmetric carbon atom.

Further, by the addition of at least one species of the optically active compound represented by the formula (Ia) or (Ib), the generation of a reverse domain in a TN-type liquid crystal composition may effectively be prevented, or the electric field responsive characteristic of a chiral nematic liquid crystal or a chiral smectic liquid crystal may be improved, and the liquid crystal state of these liquid crystals may be controlled.

Hereinafter, the present invention will be more specifically explained with reference to specific examples of production.

EXAMPLE 1

Synthesis of (—)-2-fluoroheptanol

A solution of 1.14 g (10.0 mM) of (+)-1,2-epoxyheptane ($[\alpha]_D+15.1°$ (neat)) in 5 ml of dry ether was quickly added dropwise into ice-cooled 2 ml of hydrogen fluoride/pyridine. After the addition, the mixture was stirred for 30 minutes in an ice bath, followed by addition of 10 ml of cold water and 3 times of extraction with 10 ml of ether. The extract liquid was washed 3 times with 10 ml of 1N-sodium carbonate, followed by drying with anhydrous magnesium sulfate, removal of ether by vacuum distillation and distillation with Kugelrohr distiallation apparatus, to obtain 0.492 g of crude (—)-2-fluoroheptanol. Further, by repeating the above operations, 1.35 g of the crude product was obtained and rectified by means of a Claisen flask to obtain 0.80 g (600 mM) of objective (—)-2-fluoroheptanol. Yield: 20.0%. The product showed the following properties:

B.P.: 126°–129° C./104 mmHg, $[\alpha]_D^{28.0}-11.5°$ (c=1.112, ether).

IR (liquid film): 3330, 2950, 2850, 1450, 1380, 1050, 830 cm$^{-1}$.

EXAMPLE 2

Synthesis of (—)-2-fluorooctanol

In a plastic vessel, 3 ml of hydrogene fluoride/pyridine was charged, and under ice-cooling, a solution of 1.28 g (10 mM) of R-(+)-1,2-epoxyoctane ($[\alpha]_D^{25}+14.4°$ (neat)) in 5 ml of dry ether was showly added dropwise, followed by stirring for 30 minutes. Into the solution, 15 ml of ice water was added, and the mixture was subjected to extraction with 10 ml of ether. The aqueous layer was further subjected to 2 times of extraction with 5 ml of ether. The resultant ether layer was washed with 50 ml of 1N—Na$_2$CO$_3$ aqueous solution and dried with anhydrous sodium sulfate. After the drying, the ether was distilled off, and the remainder was distilled under reduced pressure to obtain 0.64 g (4.3 mM, Yield: 43%) of a purified objective product, which showed the following properties:

B.P.: 124° C./85 mmHg, $[\alpha]_D^{26.0}-10.4°$ 8c=2, Et$_2$O).

IR (liquid film): 3330, 2950, 2850, 1450, 1380, 1050, 830 cm$^{-1}$.

$^1$H-NMR (CDCl$_3$): δ(ppm) 2.1–0.7 (m; 13H, —CH$_2$—, —CH$_3$—), 2.4 (broad, 1H, —OH), 3.2, 3.6

(t × 2.2H, 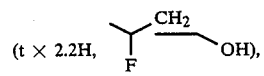), 4.9, 4.1

(m × 2.1H, 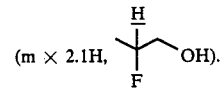).

EXAMPLE 4

(—)-2-fluorononanol was prepared in substantially the same manner as in Example 2 at a yield of 22.2%. The following properties were shown.

B.P.: 135°–136° C./45 mmHg, $[\alpha]_D^{26.8}-10.3°$ (c=1.101, ether).

IR (solid film): 3330, 2900, 1630, 1450, 1380, 1050, 830 cm$^{-1}$.

EXAMPLE 3, 5 AND 6

Optically active 2-fluoroalkanols were prepared in substantially the same manner as in Example 2. The products showed the physical properties shown in the above described Table 1.

EXAMPLE 8

A liquid crystal mixture was prepared by mixing 98 wt. parts of p,p'-pentylazoxybenzene and 2 wt.parts of 2-fluorononanol (Example 4). A TN cell (twisted nematic cell) prepared by using the liquid crystal mixture was observed to provide a nematic phase with greatly reduced reverse domain as compared with a TN cell prepared without adding the fluorononanol.

EXAMPLE 9

A liquid crystal mixture was prepared by adding 5 wt.parts of the optically active compound according to the above Example 1 to 95 wt. parts of a smectic liquid crystal MORA 8 having structure as shown below. The liquid crystal mixture showed an SmC* phase, and showed a spontaneous polarization 1.2 times that of MORA 8 alone and a response time of 35 msec, about 80% of that of MORA 8 alone, under the voltage application condition of ±15 V.

MORA 8

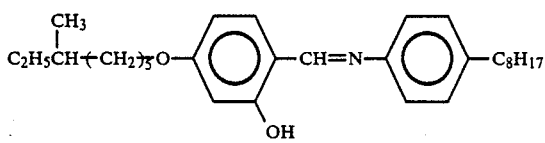

EXAMPLE 10

P-acetyloxybenzoic acid (2-fluorooctyl) ester was prepared according to the following reaction scheme.

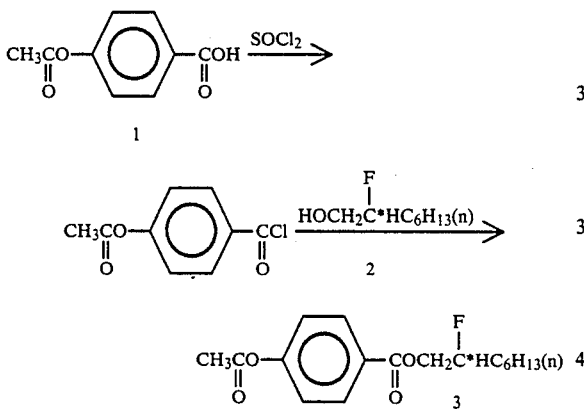

More specifically, 0.68 g (3.7 m.mol) of p-acetoxybenzoic acid (1 in the above scheme) and 7 ml of thionyl chloride were heat-refluxed for 2.5 hours, followed by distilling-off of non-reacted thionyl chloride, to obtain an oxychloride.

Then, 0.83 g (7.4 m.mol) of triethylenediamine was dissolved in 5 ml of dry benzene and dried in about 30 minutes by adding thereto potassium chloride. The solution was charged into a vessel containing 0.66 g (4.5 m.mol) of (−)-2-fluoro-1-octanol, and the mixture was stirred by vibration. The solution was added dropwise to the above obtained oxychloride under stirring, and after the completion, the mixture was stirred at 50° C. for 2 hours.

After the completion of the reaction, 8 ml of 1N-hydrochloric acid and 30 ml of water were added. The mixture was subjected to extraction with benzene, and the aqueous layer was further subjected to two times of extraction with 8 ml of benzene. To the resultant benzene layer, 15 ml of 1N-sodium carbonate was added, and the mixture was subjected to extraction with benzene, followed by two times of extraction of the aqueous layer with 8 ml of benzene, in the same manner as above. The resultant benzene layer was dried with anhydrous sodium sulfate overnight.

From the above product, benzene was distilled off to obtain a crude product, which was then purified by silica gel column chromatography with use of a benzene/hexane (1/1) mixture as an eluant to obtain 0.80 g (Yield: 69%) of p-acetyloxybenzoic acid-(2-fluorooctyl)-ester. The product showed the following optical rotation and IR (infrared absorption) data:

Optical rotation $[\alpha]_D^{24} +11.2°$ (c=2, benzene).

IR (cm$^{-1}$): 2850–2950, 1760, 1720, 1600, 1265, 1190.

EXAMPLE 11

P-hydroxybenzoic acid (2-fluorooctyl)ester was prepared according to the following reaction scheme:

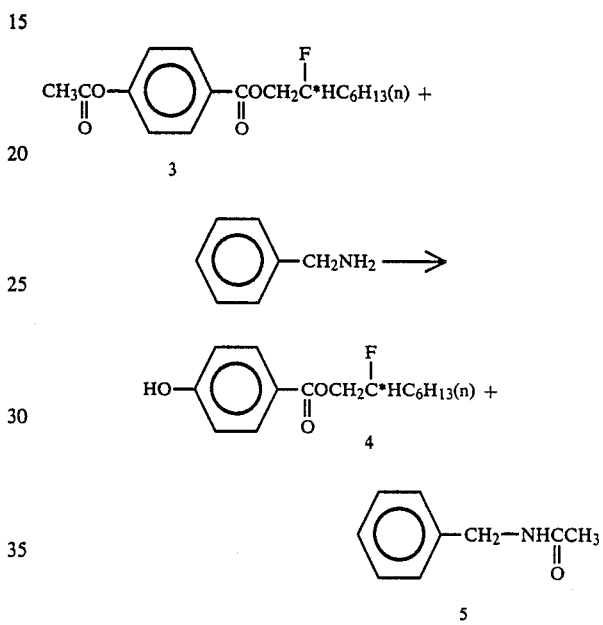

More specifically, 0.750 g (2.5 m.mol) of the above 3 was dissolved in 1.5 ml of ether, into which a solution of 0.27 g (2.5 m.mol) of benzylamine in 1.5 ml of ether was added. The mixture was left standing overnight at room temperature.

From the reaction mixture, ether was distilled off to obtain a mixture of the 4 and 5, which were then separated by silica gel chromatography by using a ethyl acetate/methylene chloride (1/9) mixture liquid to obtain 0.53 g (yield: 78%) of a purified product of 4, which showed the following optical rotation and IR data:

Optical rotation $[\alpha]_D^{27.6} +12.6°$ (c=2, benzene).

IR (cm$^{-1}$): 3390, 2850–2940, 1675, 1605, 1590, 1265.

EXAMPLE 12

P-hydroquinone mono(2-fluorodecyl) ether was prepared according to the following reaction scheme:

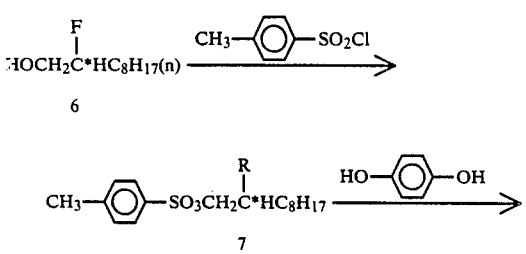

-continued

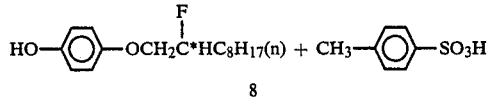

More specifically, 3.15 g (18 m.mol) of 2-fluorodecanol (6) and 4.25 g (54 m.mol) of dry pyridine were changed and stirred in a vessel with an inner atmosphere of nitrogen. The vessel was cooled with water, and 3.75 g (20 m.mol) of p-toluenesulfonyl chloride was added in two divisions, followed by stirring for 3 hours. After the completion of the reaction, the reaction mixture was neutralized with 2N-hydrochloric acid and subjected to extraction with 10 ml of methylene chloride, followed by additional two times of extractin of the aqueous layer with 5 ml of methylene chloride. Water was added to the methylene chloride layer, and the extraction with methylene chloride as described above was repeated. The resultant methylene chloride solution was dried overnight with anhydrous sodium sulfate.

After distilling off the methylene chloride, 5.6 g (yield: 94%) of 2-fluorodecyl-p-toluenesulfonate (7) was obtained. The product showed the following optical rotation and IR data:

Optical rotation $[\alpha]_D^{22.0}$ +4.2° (c=2, methylene chloride).

IR (cm$^{-1}$): 2850-2900, 1600, 1350, 1170, 1100, 660, 550.

To 5.60 g (17 m.mol) of preliminary obtained 7, 3.74 g (34 m.mol) of hydroquinone and 5 ml of 1-butanol were added and stirred. Therein, a solution of 1.02 g (25 m.mol) in 13 ml of 1-butanol was slowly added dropwise, followed by 7 hours of reaction at 130° C. After the completion of the reaction, 40 ml of water was added, followed by extractio with ether. The resultant ether solution was dried overnight with anhydrous sodium sulfate. After distilling off the solvent, the remainder was separated by silica gel chromatography with methylene chloride to obtain 2.57 g (yield: 56%) of a purified product of p-hydroquinone mono(2-fluorodecyl) ether (8).

Optical rotation $[\alpha]_D^{24.0}$ +1.8° (c=2, methylene chloride).

IR (cm$^{-1}$): 3600-3200, 2900, 1680, 1590, 1280, 1160, 700.

EXAMPLES 13-20

In similar manners as in the above mentioned Examples 10-12, optically active compounds having different A, m, n or R in the formula (Ib) were prepared and subjected to measurement of optical rotations. The results are summarized in the following Table 2 together with those obtained in Examples 10-12.

TABLE 2

$$A\text{-}(\bigcirc)_{\overline{m}}\text{-}(CO)_{\overline{n}}\text{OCH}_2\overset{F}{\underset{|}{C}}{}^*\text{HR} \quad (Ib)$$

| A | m | n | R | $[\alpha]_D$ |  | Example |
|---|---|---|---|---|---|---|
| CH$_3$CO—O— | 1 | 1 | n-C$_7$H$_{15}$— | +7.94° (27.6° C.) | C = 1.11, benzene | 13 |
| CH$_3$CO—O— | 1 | 1 | n-C$_6$H$_{13}$— | +11.2° (24° C.) | C = 2, benzene | 10 |
| CH$_3$CO—O— | 2 | 1 | n-C$_6$H$_{13}$— | +9.4° (22° C.) | C = 1, CH$_2$Cl$_2$ | 14 |
| HO— | 1 | 1 | n-C$_7$H$_{15}$— | +9.52° (26.4° C.) | C = 1.01, benzene | 15 |
| HO— | 1 | 1 | n-C$_6$H$_{13}$— | +12.6° (27.6° C.) | C = 2, benzene | 11 |
| HO— | 2 | 1 | n-C$_6$H$_{13}$— | +9.04° (21° C.) | C = 1, CH$_2$Cl$_2$ | 16 |
| HO— | 1 | 0 | n-C$_8$H$_{17}$— | +1.8° (24° C.) | C = 2, CH$_2$Cl$_2$ | 12 |
| HO— | 1 | 0 | n-C$_5$H$_{11}$— | +2.2° (19° C.) | C = 2, CH$_2$Cl$_2$ | 17 |
| HO— | 1 | 0 | n-C$_{12}$H$_{25}$— | +2.6° (24° C.) | C = 2, CH$_2$Cl$_2$ | 18 |
| HO— | 2 | 0 | n-C$_6$H$_{13}$— | +5.5° (23.2° C.) | C = 2, acetone | 19 |
| HO— | 1 | 0 | n-C$_6$H$_{13}$— | +3.0° (20° C.) | C = 2, CH$_2$Cl$_2$ | 20 |

EXAMPLE 21

A liquid crystal mixture was prepared by mixing 95 wt. parts of p,p'-pentylazoxybenzene and 5 wt. parts of the optically active compound according to Example 17. A TN cell (twisted nematic cell) prepared by using the liquid crystal mixture was observed to provide a nematic phase with greatly reduced reverse domain as compared with a TN cell prepared without adding the compound.

EXAMPLE 22

A liquid crystal mixture was prepared by adding 5 wt. parts of the optically active compound according to the above Example 18 to 95 wt. parts of a smectic liquid crystal MORA 8 having a structure as shown below. The liquid crystal mixture showed an SmC* phase, and showed a spontaneous polarization 1.8 times that of MORA 8 alone and a response time of 25 msec, about 60% of that of MORA 8 alone, under the voltage application condition of ±15 V.

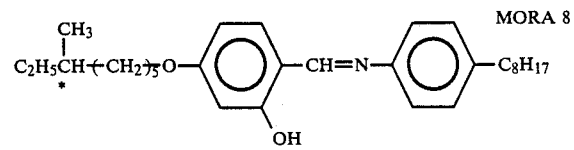

What is claimed is:

1. An optically active compound represented by the formula (Ib):

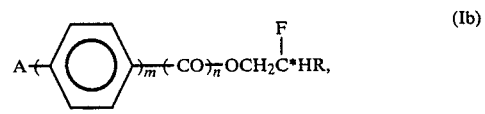

wherein R is an alkyl group having 1-16 carbon atoms, C* is an asymmetric carbon atom, m is 1 or 2, n is 0 or 1, and A is a releaseable substituent selected from the group consisting of hydroxy, halogen, phenoxy, toluenesulfonyl, acetyloxy, and trifluoroacetyloxy.

2. A compound according to claim 1, wherein said A is acetyloxy.

3. A compound according to claim 1, wherein said A is hydroxy.

4. A compound according to claim 1, wherein said R is pentyl.

5. A compound according to claim 1, wherein said R is hexyl.

6. A compound according to claim 1, wherein said R is heptyl.

7. A compound according to claim 1, wherein said R is octyl.

8. A compound according to claim 1, wherein said R is lauryl.

9. A liquid crystal composition comprising a liquid crystal and at least one species of optically active compound represented by the formula (Ib):

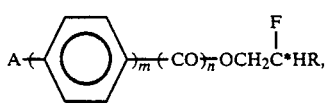

wherein R is an alkyl group having 1-16 carbon atoms, C* is an asymmetric carbon atom, m is 1 or 2, n is 0 or 1, and A is a releaseable substituent selected from the group consisting of hydroxy, halogen, phenoxy, toluenesulfonyl, acetyloxy, and trifluoroacetyloxy.

10. A liquid crystal composition according to claim 9, which has a temperature range wherein it assumes a chiral smectic phase.

11. A liquid crystal composition according to claim 10, wherein said chiral smectic phase is chiral smectic C phase.

12. A liquid crystal composition according to claim 9, wherein said liquid crystal is a liquid crystal showing a smectic phase.

13. A liquid crystal composition according to claim 12, wherein said smectic phase is chiral smectic phase.

14. A liquid crystal composition according to claim 9, wherein said liquid crystal is a nematic liquid crystal.

15. A liquid crystal composition according to claim 9, wherein said liquid crystal is a chiral nematic liquid crystal.

16. A liquid crystal composition according to claim 12 wherein said liquid crystal showing a smectic phase is a ferroelectric liquid crystal.

17. A liquid crystal composition according to claim 16, which contains said optically active compound in a proportion of 0.1 to 80 wt. %.

18. A liquid crystal composition according to claim 16, wherein said ferroelectric liquid crystal has a biphenyl-4-carboxylate unit.

19. A liquid crystal composition according to claim 16, wherein said ferroelectric liquid crystal has an azoxybenzene unit.

20. A liquid crystal composition according to claim 16, wherein said ferroelectric liquid crystal has a 2-phenylpyrimidine unit.

21. A liquid crystal composition according to claim 16, wherein said ferroelectric liquid crystal has a phenylbenzoate unit.

* * * * *

UNITED STATES PATENT AND TRADEMARK OFFICE
CERTIFICATE OF CORRECTION

PATENT NO. : 4,873,018
DATED : October 10, 1989
INVENTOR(S) : HIROYUKI NOHIRA ET AL.

Page 1 of 3

It is certified that error appears in the above-indentified patent and that said Letters Patent is hereby corrected as shown below:

ON THE TITLE PAGE:
AT [56] REFERENCES CITED

U.S. Patent Documents, "Isogar et al." should read --Isogai et al.--.

AT [57] ABSTRACT

"a" (first occurrence) should read --an-- and "responsive" should read --response--.

COLUMN 1

Line 19, "(1968);" should read --(1968));--.
Line 26, "36 899" should read --36, 899--.

COLUMN 2

Line 1, "coventional" should read --conventional--.
Line 2, "has" should read --have--.
Line 27, "active" should read --active compound--.
Line 33, "a" should read A--.

COLUMN 3

Line 7, "1-6 carbon atoms;" should read --1-16 carbon atoms;--.
Line 19, "an urethane" should read --a urethane--.

UNITED STATES PATENT AND TRADEMARK OFFICE
CERTIFICATE OF CORRECTION

PATENT NO. : 4,873,018
DATED : October 10, 1989
INVENTOR(S) : HIROYUKI NOHIRA ET AL.

It is certified that error appears in the above-indentified patent and that said Letters Patent is hereby corrected as shown below:

COLUMN 4

Table 1, " $[\ ]D \atop (C=2\ Et_2O)$ " should read -- $[\alpha]D \atop (C=2\ Et_2O)$ --.

COLUMN 7

Line 32, "acitve" should read --active--.

COLUMN 9

Line 36, "providng" should read --providing--.

COLUMN 10

Line 9, "hydrogene" should read --hydrogen--.
Line 25, "8c=2," should read --(c=2,--.
Line 54, "EXAMPLE 3, 5 AND 6" should read --EXAMPLES 3, 5 AND 6--.

COLUMN 12

Line 46, "a" should read --an--.

COLUMN 13

Line 30, "changed" should read --charged--.
Line 37, "extractin" should read --extraction--.
Line 58, "extractio" should read --extraction--.

UNITED STATES PATENT AND TRADEMARK OFFICE
CERTIFICATE OF CORRECTION

PATENT NO. : 4,873,018
DATED : October 10, 1989
INVENTOR(S) : HIROYUKI NOHIRA ET AL.

It is certified that error appears in the above-indentified patent and that said Letters Patent is hereby corrected as shown below:

COLUMN 14

Line 68, "releaseable" should read --releasable--.

COLUMN 15

Line 33, "releaseable" should read --releasable--.

Signed and Sealed this

Fifth Day of August, 1997

Attest:

BRUCE LEHMAN

Attesting Officer

Commissioner of Patents and Trademarks